Nov. 14, 1950     D. K. SPEED     2,530,093
TRANSPONDER TESTER CIRCUIT
Filed Dec. 10, 1945
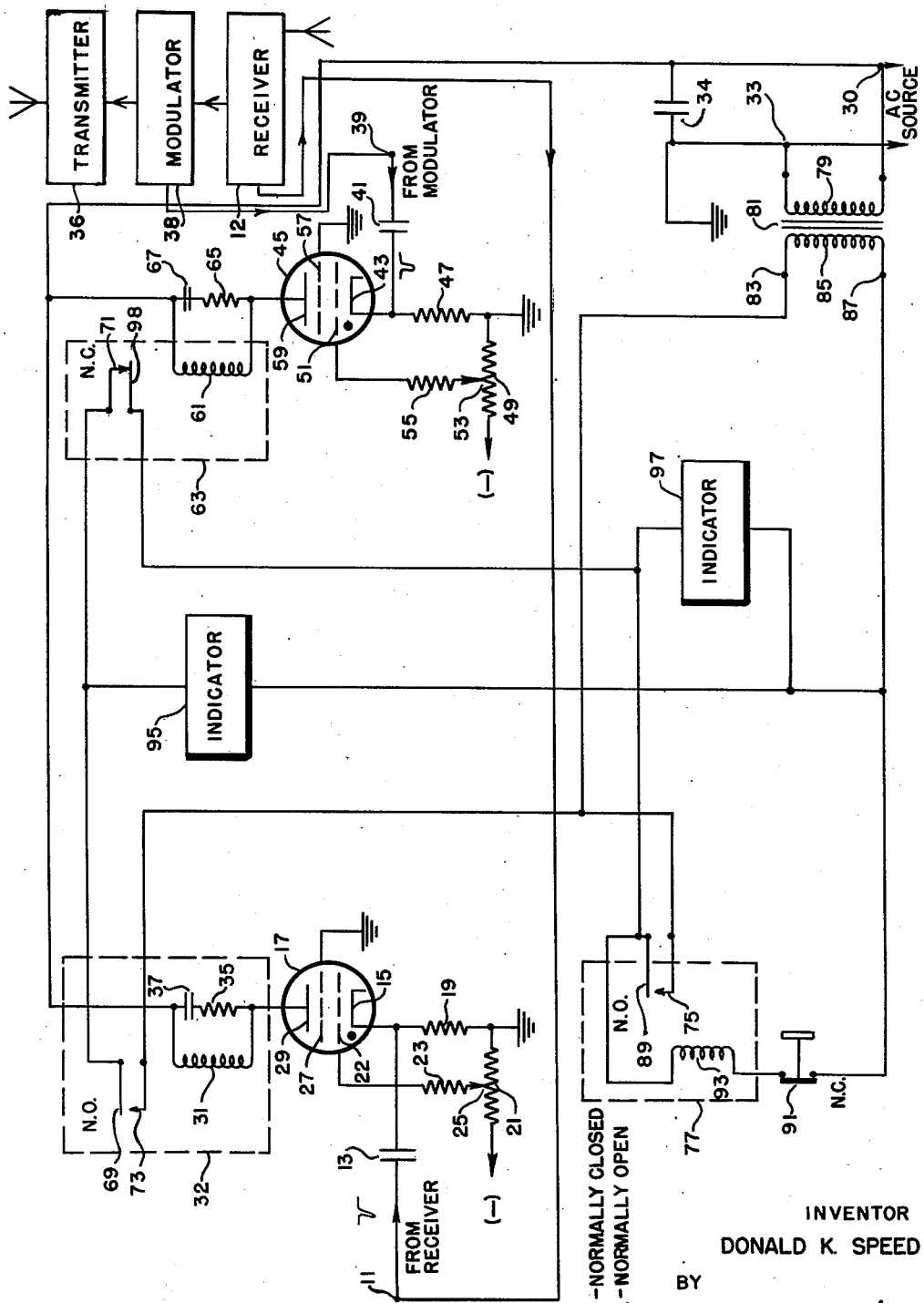
INVENTOR
DONALD K. SPEED
BY
William D. Hall.
ATTORNEY Patented Nov. 14, 1950

2,530,093

UNITED STATES PATENT OFFICE 2,530,093

TRANSPONDER TESTER CIRCUIT

Donald K. Speed, Boston, Mass., assignor, by mesne assignments, to the United States of America as represented by the Secretary of War Application December 10, 1945, Serial No. 634,081

11 Claims. (Cl. 177—353)

This invention relates in general to electrical circuits and more particularly to test circuits for beacon systems.

In beacon transponders or systems which receive interrogating signals and in return transmit a characteristic signal back to the interrogating station, it is usually desirable to know if the transponder is functioning properly, that is, if it is receiving the interrogating signals and transmitting a response.

It is an object, therefore, of this invention to provide a circuit which will give an indication signal if a beacon transponder is operating properly.

It is a further object of this invention to provided a circuit which will give another indication signal if a beacon transponder is not operating properly.

In general, this invention uses two gas tubes, three relays, and two indicators in a circuit. The first gas tube is turned on if the transponder is properly interrogated and the first relay is actuated thereby actuating the first indicator. The second gas tube is actuated if the transponder is replying properly thereby actuating the second relay and opening the circuit to the second indicator. Therefore, if the transponder is not responding properly, the second indicator is actuated. The third relay is used in a reset push button circuit for turning off the second indicator after the trouble has been repaired.

Other objects, features, and advantages of this invention will suggest themselves to those skilled in the art and will become apparent from the following description of the invention taken in connection with the accompanying drawing in which the sole figure is a schematic circuit diagram of the invention.

Referring now to the figure, demodulated interrogation pulses from the receiver 12 of the beacon transponder are applied to the circuit at point 11. These pulses are coupled through capacitor 13 to cathode 15 of Thyratron 17. Cathode 15 is returned to ground through resistor 19. Potentiometer 21 is connected between ground and a source of negative potential. Control grid 22 of Thyratron 17 is biased negatively by returning it through resistor 23 to arm 25 of potentiometer 21. Screen grid 27 of Thyratron 17 is grounded. Plate 29 of Thyratron 17 is returned to terminal 30 of a source of alternating current voltage, referred to hereinafter as A. C. source, through coil 31 of relay 32. Terminal 33 of the A. C. source is returned to ground. Bypass capacitor 34 shunts the A. C. source. In parallel with coil 31 is a series combination of resistor 35 and capacitor 37.

Pulses from the modulator 38 of transmitter 36 in the transponder are applied at point 39 and coupled through capacitor 41 to cathode 43 of Thyratron 45. The cathode 43 is returned to ground through resistor 47. Potentiometer 49 is connected between ground and a source of negative potential. Control grid 51 of Thyratron 45 is negatively biased by connecting it to arm 53 of potentiometer 49 through resistor 55. Screen grid 57 of Thyratron 45 is connected to ground. Plate 59 of Thyratron 45 is returned to terminal 30 through coil 61 of relay 63. A series combination of resistor 65 and capacitor 67 is connected in parallel with coil 61.

Contact 69 of relay 32 is connected to contact 71 of relay 63. Contact 73 of relay 32 is connected to contact 75 of relay 77. Primary winding 79 of transformer 81 is connected across terminals 30 and 33. Terminal 83 of secondary winding 85 of transformer 81 is connected to contact 75. Terminal 87 of secondary winding 85 of transformer 81 is connected to contact 89 of relay 77 through a push button switch 91 and coil 93 of relay 77. Indicator 95 is connected between contact 71 and terminal 87. Indicator 97 is connected between contact 98 of relay 63 and terminal 87. Relays 32 and 77 are normally open and relay 63 and push button switch 91 are normally closed.

In operation, negative pulses from the receiver in the transponder are applied to the cathode 15 turning on Thyratron 17 and thereby actuating relay 32. When relay 32 closes, the secondary voltage of transformer 81 is applied across the indicator 95, which is then activated. Indicator 95 might be, for example, an incandescent lamp. If the transponder is properly responding, negative pulses occurring substantially at the same time as the negative pulses at cathode 15 will appear at cathode 43. The Thyratron 45 therefore is caused to conduct and relay 63 is opened. With relay 63 open, no voltage appears across indicator 97 and it is therefore not activated. Indicator 97 also might be, for example, an incandescent lamp, preferably of a different color. However, if the transponder is not responding properly relay 63 will remain closed and indicator 97 is activated indicating trouble in the system.

If this is the case, relay 77 is caused to close since voltage will appear across coil 93 because relays 63 and 32 are closed. However, if the trouble is repaired and the system is again responding and relay 63 is opened indicator 97 will still be activated since there is voltage across indicator 97 due to relay 77 being closed. To deenergize indicator 97, the push button switch 91 is opened, breaking the coil 93 current and thereby opening relay 77. If, however the push button switch 91 is opened before the trouble is repaired, relay 77 will open but will close again as soon as switch 91 is closed since relays 63 and 32 provide a closed path whereby voltage is applied across coil 93. Therefore indicator 97 cannot be deenergized until the trouble is repaired.

In practice, the A. C. source at terminals 30 and 33 is 110 volts, 60 cycles per second and the transformer 81 steps this voltage down to 6 volts to be used to activate the relays and indicators.

If the pulse repetition frequency of the interrogating signal is at least twice the frequency of the A. C. source, the Thyratron 17 will conduct on every positive cycle of the A. C. source. On the negative cycles no conduction will take place. It will become apparent then that several higher harmonics are present in the resulting plate current waveform. It is the purpose of resistor 35 and capacitor 37 to effectively by-pass these higher frequencies in order that the current through the coil 31 will be at substantially the same frequency as the A. C. source. Resistor 65 and capacitor 67 serve the same purpose in the case of Thyratron 45 and relay 63.

While there has been described what is at present considered to be the preferred embodiment of this invention, it will be obvious to those skilled in the art that various changes and modifications may be made therein without departing from the scope of the invention as set forth in the appended claims, and I claim all such changes and modifications as fall fairly within the spirit and scope of this invention.

What is claimed is:

1. In a test circuit for beacon transponders, a first gas filled tube, a second gas filled tube, said gas tubes having at least a cathode, control grid, and plate, a first relay, a second relay, a third relay, said relays having a coil and at least two contacts, said first and third relays being normally open; each having a front and an armature contact, and said second relay being normally closed, having a back and an armature contact; a first indicator means, a second indicator means, a switch means normally closed, a source of alternating current voltage, a transformer having at least a primary and a secondary winding, means connecting the primary of said transformer to the said alternating current source, means for biasing said first tube beyond cut-off, means for applying a signal to one electrode of said first tube whereby said first tube conducts, means connecting the coil of said first relay between the plate of said first tube and a first terminal of said alternating current source, means for biasing said second tube beyond cut-off, means for applying a signal to one electrode of said second tube whereby said second tube will conduct, means connecting the coil of said second relay between the plate of said second tube and said first terminal of said alternating current source, means connecting said armature contact of said first relay to said back contact of said second relay, means connecting said front contact of said first relay to said front contact of said third relay, means connecting said armature contact of said second relay to said armature contact of said third relay, means connecting said front contact of said third relay to a first terminal of the secondary winding of said transformer, means connecting the coil of said third relay in series with said switch means, means connecting said series connection between said front contact of said third relay and a second terminal of said secondary winding, means connecting first indicator means between said back contact of said second relay and second terminal of said secondary winding, and means connecting said second indicator means between said armature contact of said second relay and said second terminal of said secondary winding.

2. In a test circuit for beacon systems, a first and second electron tube each having at least a cathode, control grid, and plate, a source of voltage, a first and second relay each having at least a coil and two contacts, said relays having a front and an armature and a back and an armature contact respectively; a first and second indicator means, means connecting a coil of said first relay between a plate of said first tube and a source of voltage, means connecting a coil of said second relay between a plate of said second tube and the source of voltage, means connecting said first indicator means in a series circuit with the two contacts of said first relay and a source of voltage, and means connecting said second indicator means in a series circuit with the two contacts of said second relay, said two contacts of said first relay, and a source of voltage.

3. Apparatus in accordance with claim 2 wherein there is provided a third relay having at least a coil, a front and an armature contact, and switching means, said second indicator means being also connected in series with said contacts of said third relay, a coil of said third relay, and said switching means whereby said second indicator means is deenergized only after transmitter signals appear at said second tube and said switching means is opened.

4. A test apparatus for use with a beacon transponder, said transponder including a receiver, a transmitter, and means for modulating said transmitter in response to signals received by said receiver, comprising a first normally open switching means, a second normally closed switching means, an indicator, a source of voltage; means for serially connecting said first switching means, said second switching means, said indicator, and said source of voltage; means for effecting a closing of said first switching means in response to a signal from said receiver having a connection for application thereto and means for effecting an opening of said second switching means in response to a signal from said modulator having a connection for application thereto whereby said indicator is energized when said first signal is present and said second signal is absent.

5. A test apparatus as defined in claim 4, further including an additional indicator, means for serially connecting said additional indicator, said first switching means, and said source of voltage, whereby said additional indicator is energized in response to the presence of said receiver signal.

6. A test apparatus as defined in claim 4, further including a third normally open switching means, means for serially connecting said third switching means, said indicator, and said source of voltage, second means for effecting a closing of said third switching means, means for connecting in parallel said second closing means and said indicator, whereby said indicator, after being initially energized, is maintained energized, and further including a circuit breaker in series with said second closing means for effecting a release of said third switching means.

7. A test apparatus as defined in claim 4, wherein said closing means includes a first electron tube having a space-current path, a first electromagnet for actuating said first switching means; means for serially connecting the space-current path of said first tube, said first electromagnet, and a source of voltage; and means for controlling the space-current through said first electron tube in response to a signal from said receiver, whereby said first electromagnet is effective in closing said first switching means when a receiver signal is present; and wherein said opening means includes a second electron tube having a space-current path, a second electromagnet for actuating said second switching means; means for serially connecting the space-current path of said second tube, said second electromagnet, and a source of voltage; and means for controlling the space-current through said second electron tube in response to a signal from said modulator, whereby said second electromagnet is effective in opening said second switching means when a modulator signal is present.

8. A beacon transponder comprising a receiver for receiving interrogating signals, a modulator for providing responding signals in response to interrogating signals in said receiver; and an apparatus for indicating the presence of responding signals transmitted in response to received interrogating signals including a first normally open switching means, a second normally closed switching means, an indicator, a source of voltage; means for serially connecting said first switching means, said second switching means, said indicator and said source of voltage; means for effecting a closing of said first switching means in response to said received interrogating signals including a connection to said receiver, and means for effecting an opening of said second switching means in response to said responding signals including a connection to said modulator, whereby said indicator is energized when said interrogating signals are present and said responding signals are absent.

9. A beacon transponder as defined in claim 8, further including an additional indicator; means for serially connecting said additional indicator, said first switching means; and said source of voltage, whereby said additional indicator is energized in response to the presence of said interrogating signals.

10. A beacon transponder as defined in claim 8, further including a third normally open switching means; means for serially connecting said third switching means, said indicator, and said source of voltage; a second means for effecting a closing of said third switching means, means for connecting in parallel said second closing means and said indicator, whereby said indicator, after being initially energized, is maintained energized and further including a circuit breaker in series with said second closing means for effecting a release of said third switching means.

11. A beacon transponder as defined in claim 8, wherein said closing means includes a first electron tube having a space-current path, a first electromagnet for actuating said first switching means, means for serially connecting the space-current path in said first tube, said first electromagnet, and a source of voltage; and means for controlling the space-current through said first electron tube in response to said interrogating signals, whereby said first electromagnet is effective in closing said first switching means when said interrogating signals are present; and wherein said opening means includes a second electron tube having a space-current path, a second electromagnet for actuating said second switching means, means for serially connecting the space current path of said second tube, said second electromagnet, and a source of voltage; and means for controlling the space-current through said second electron tube in response to said responding signals, whereby the magnetic field of said second electromagnet is effective in opening said switching means when said responding signals are present.

DONALD K. SPEED.

REFERENCES CITED

The following references are of record in the file of this patent:

UNITED STATES PATENTS

| Number | Name | Date |
|---|---|---|
| 1,069,347 | Reid | Aug. 5, 1913 |
| 1,522,581 | Espenschied | Jan. 13, 1925 |
| 2,075,822 | Miller | Apr. 6, 1937 |
| 2,114,889 | Stratton | Apr. 19, 1938 |

FOREIGN PATENTS

| Number | Country | Date |
|---|---|---|
| 429,842 | Great Britain | June 7, 1935 |